United States Patent
Peterson et al.

(10) Patent No.: US 7,083,284 B2
(45) Date of Patent: Aug. 1, 2006

(54) METHOD AND APPARATUS FOR SEQUENCING LIGHT EMITTING DEVICES IN PROJECTION SYSTEMS

(75) Inventors: Mark D. Peterson, Lake Oswego, OR (US); T. Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 88 days.

(21) Appl. No.: 10/836,460

(22) Filed: Apr. 30, 2004

(65) Prior Publication Data

US 2005/0243282 A1    Nov. 3, 2005

(51) Int. Cl.
*G03B 21/00* (2006.01)
*G09G 3/14* (2006.01)
*G09G 3/32* (2006.01)
*G09G 3/20* (2006.01)
*G09G 3/36* (2006.01)
*G09G 3/18* (2006.01)
*G09G 3/30* (2006.01)

(52) U.S. Cl. .......................... 353/31; 353/121; 345/39; 345/83; 345/55; 345/96; 345/54; 345/79; 345/209

(58) Field of Classification Search ................ 345/39, 345/82–83, 55, 96, 54, 79, 3.2, 209; 353/31, 353/121
See application file for complete search history.

(56) References Cited

U.S. PATENT DOCUMENTS

| | | | |
|---|---|---|---|
| 5,657,099 A | 8/1997 | Doherty et al. | |
| 5,729,243 A | 3/1998 | Cavallerano et al. | |
| 5,751,264 A | 5/1998 | Cavallerano et al. | |
| 5,903,323 A | 5/1999 | Ernstoff et al. | |
| 6,224,216 B1* | 5/2001 | Parker et al. | 353/31 |
| 6,520,648 B1 | 2/2003 | Stark et al. | |
| 6,628,249 B1* | 9/2003 | Kamikawa et al. | 345/44 |
| 2001/0022613 A1 | 9/2001 | Takeshi et al. | |
| 2004/0140972 A1* | 7/2004 | Hirota et al. | 345/204 |

FOREIGN PATENT DOCUMENTS

| EP | 1 489 854 A | 12/2004 |
|---|---|---|
| WO | WO 2004/032523 A | 4/2004 |

* cited by examiner

*Primary Examiner*—W. B. Perkey
*Assistant Examiner*—Magda Cruz
(74) *Attorney, Agent, or Firm*—Schwabe Williamson & Wyatt

(57) ABSTRACT

Embodiments of the present invention include an apparatus, method and system relating to a projection illumination source pulsing one or more light emitting devices a plurality of times per frame.

18 Claims, 4 Drawing Sheets

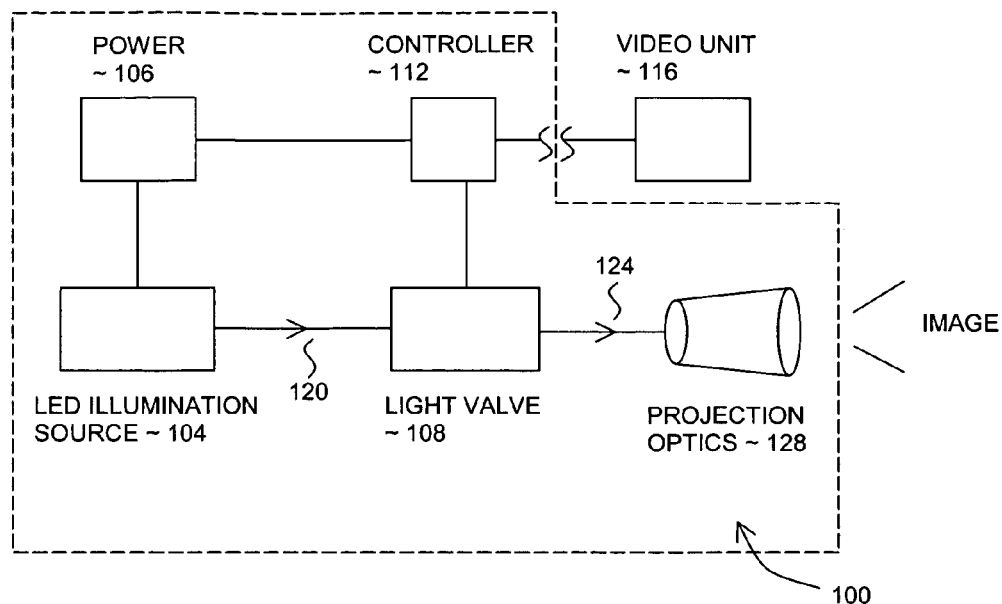
FIG. 1
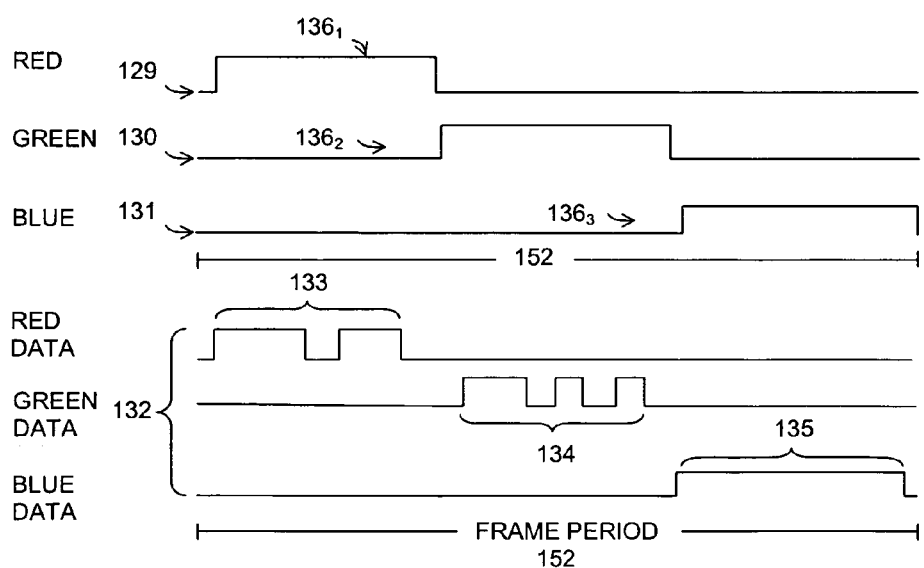
FIG. 2A
FIG. 2B

METHOD AND APPARATUS FOR SEQUENCING LIGHT EMITTING DEVICES IN PROJECTION SYSTEMS

FIELD

Disclosed embodiments of the present invention relate to the field of projection systems, and more particularly to the sequencing of light emitting devices used as illumination sources in those projector systems.

BACKGROUND OF THE INVENTION

Multimedia projection systems have become popular for purposes such as conducting sales demonstrations, business meetings, classroom training, and for use in home theaters. In typical operation, multimedia projection systems receive video signals from a video unit and convert the video signals to digital information to control one or more digitally driven light valves. The light valves may have selectively switchable picture elements or pixels that correspond to a projected image pixel. If a light valve pixel is turned to an "on" state it will pass incident light on (either reflectively or transmissively) as image bearing light, typically through additional optics such as a projection lens. The image transmitted from the light valve at any one moment in time will be a matrix of light corresponding to all of the 'on' pixels at that moment in time. This may be referred to as a bitmap image. Recent focus has turned to using light emitting devices such as light emitting diodes (LEDs) as an illumination source to provide the incident light in multimedia projection systems.

BRIEF DESCRIPTION OF THE DRAWINGS

Embodiments of the invention are illustrated by way of example and not by way of limitation in the figures of the accompanying drawings, in which the like references indicate similar elements and in which:

FIG. 1 illustrates a projection system using an illumination source in accordance with an embodiment of this invention;

FIGS. 2a–2b depict waveform graphs representing light emitting device pulsing sequences with corresponding pixel control data, in accordance with an embodiment of this invention;

DETAILED DESCRIPTION OF EMBODIMENTS OF THE INVENTION

Figure 3A:
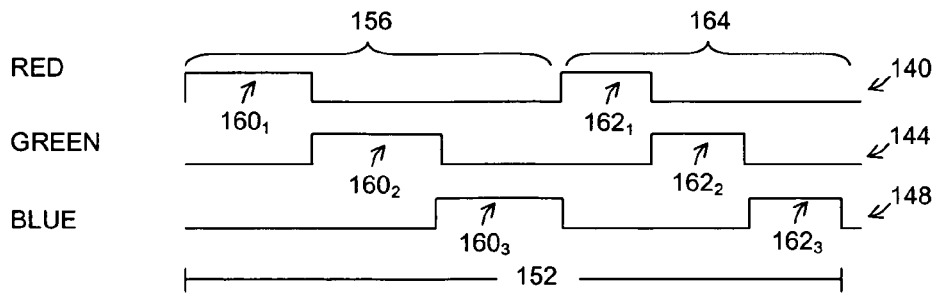
FIGS. 3a–3b depict waveform graphs representing light emitting device pulse sequences of multiple subframes with corresponding pixel control data, in accordance with an embodiment of this invention.

In the following detailed description, reference is made to the accompanying drawings that form a part hereof, wherein like numerals designate like parts throughout and in which is shown, by way of illustration, specific embodiments in which the invention may be practiced. It is to be understood that other embodiments may be utilized and structural or logical changes may be made without departing from the scope of the embodiments of the present invention. Therefore, the following detailed description is not to be taken in a limiting sense and the scope of the embodiments of the present invention are defined by the appended claims and their equivalents.

FIG. 1 illustrates a simplified pictorial view of a multimedia projection system 100, using a light emitting device based illumination source 104, and coupled to a video unit 116 in accordance with an embodiment of this invention. The illumination source 104 may be coupled to a power supply 106 and optically coupled to a light valve arrangement 108. The light valve arrangement 108 may represent one or more displays including, but not limited to, a digital micromirror device (DMD), a liquid crystal display (LCD), and a liquid crystal on silicon (LCOS) display. The light valve arrangement 108 may have selectively switchable pixels, whether mechanically or electrically defined, that correspond to one or more image pixels. Depending on the cost, brightness, and image quality goals of the particular projection systems, the light valve arrangement 108 may be of various sizes and resolutions, be transmissive or reflective, and be employed in single or multiple display configurations.

The illumination source 104 may sequentially provide the light valve 108 with incident light 120 of a number of constituent colors by pulsing one or more light emitting devices of each constituent color. The constituent colors may be thought of as the individual colors that, when combined in the appropriate amounts, create an object color for the image pixel. In one embodiment the constituent colors may include red, green and blue, however, alternative embodiments may additionally or alternatively employ many other colors, including white and other color combinations.

In one embodiment, if more than one light emitting device is used for one constituent color, the average emitted wavelength may be the center wavelength corresponding to the desired color of light. For example, one embodiment may employ green light with a center wavelength of 520 nm. This green light may be the product of a number of light emitting devices emitting, e.g., wavelengths of 500 nm combined with an equal number of light emitting devices emitting wavelengths of 540 nm. This embodiment may be desirable when obtaining light emitting devices of a particular wavelength proves to be difficult due to high cost or low availability.

In one embodiment, the light emitting devices of the illumination source 104 may include solid state light sources capable of being pulsed in a manner to be described in more detail below. Examples of such solid state light sources may include, but are not limited to, light emitting diodes (LEDs) and laser diodes.

In one embodiment, the first constituent color, e.g., red, may illuminate the light valve arrangement 108 for a predetermined time period. While the light valve arrangement 108 is illuminated with the red light, a specific light valve pixel may be turned to an 'on' state, or activated, for a certain amount of time depending on the desired intensity of red for that pixel for that image frame. The greater the amount of time the light valve pixel is on, the brighter the shade of red. This illumination process may be repeated for the remaining constituent colors, e.g. green and blue. The amount of each constituent color that is passed on as image bearing light 124 will typically determine the projected color of the image pixel for that image frame.

The light valve arrangement 108 may be coupled to a controller 112. The controller 112 may be coupled to the power supply 106 and may be adapted to receive video signals (either analog or digital) from the video unit 116 and to transmit light valve control signals to the light valve arrangement 108. The video unit 116 may include, but is not limited to, a personal or laptop computer, DVD, set-top box (STB), integrated television tuner, video camera, or any other suitable device to transmit video signals to the projection system 100. The projection system 100 may be implemented in a variety of different applications including, but not limited to, games, movies, television, advertising and data display.

The controller 112 may generate image frames from an analog video signal based upon a desired frame rate (typically measured in frames per second (fps)). This process may be omitted if the incoming video signal is a digital signal, as the image frames should already be defined. However, there may be some instances where a frame rate conversion of the source video signal may be desired. In such a case, frame rate conversion techniques, otherwise known in the art may be employed.

The image frame may be pixmapped such that each image pixel is associated with an object color for the image frame. The choice of the possible object colors may be related to the quantization (or intensity) levels of each of a number of constituent colors. The number of object colors that the projection system 100 is capable of producing may be determined by the color depth of the system 100.

The color depth, or bit depth, is the number of bits allocated per pixel in a frame buffer memory of the controller 112 that determine the given pixel's object color for the frame. A larger color depth means that the system 100 may accommodate a greater number of object colors. However, a larger color depth also corresponds to increases in the amount of resources required by the system 100, e.g., memory, processor capabilities, etc. Common color depth values are 16- and 24-bits, although others may be used. A 24-bit color depth, which is also referred to as "true color," may have, e.g., three bytes of storage per pixel per frame. For an embodiment with three constituent colors, this results in 1 byte of data representing 256 different intensities for each of the constituent colors. In various embodiments different bit allocations resulting in different number of bits representing each constituent color, may be used. Combining the different intensity levels of the three constituent colors could result in a choice of over 16 million possible colors. For the purpose of example, the simplified embodiments illustrated and discussed below involve a 9-bit color depth, and each of the three constituent colors will be accorded three bits for determining the intensity level of that constituent color for that image frame. For the illustrated embodiment, 3-bits could allow for eight intensity levels for each of the constituent colors, which could in turn result in an image pixel having one of 512 object colors (e.g., 8 red intensities*8 green intensities*8 blue intensities).

Based on the desired object color of each image pixel the controller 112 may generate and route pixel control data for the individual light valve pixels in order to facilitate the modulation of incident light 120 from the illumination source 104 into image bearing light 124. The pixel control data may be synchronized with the light emitting device pulse sequences generated in accordance with embodiments of this invention as will be discussed below. The image bearing light 124 may then be passed on to projection optics 128, which may facilitate the final imaging on a screen, a display, or some other mechanism. The projection optics 128 may include a projection lens, an imaging lens, and many other optical components known in the field.

In one embodiment, the light paths of the constituent colors could coincide with one another prior to the incident light 120 illuminating the light valve(s) of the light valve arrangement 108, such that the light valve(s) receive(s) the incident light 120 of all of the constituent colors, along the same path. This overlapping of the light paths may facilitate the conservation of the étendue, or light throughput, of the projection system 100. The light paths of the various constituent colors could be combined by an X-cube, one or more dichroic mirrors, or by some other mechanism. Alternatively, light from the different constituent colors may travel different paths prior to illuminating the light valve(s). An embodiment of a specific application may include additional optical components to modulate the light path in order to facilitate the presentation of light from the Light emitting devices to the light valves. Examples of such components include, but are not limited to collimators, integrators, mirrors, and imaging lenses.

FIG. 2a depicts waveform graphs representing light emitting device pulse sequences generated in accordance with an embodiment of this invention. Specifically, waveform graphs 129, 130, and 131 representing light emitting device pulse sequences resulting in three constituent colors, e.g., red, green and blue, are shown over one frame period 152. Each of the constituent colors may be composed of light from one or more light emitting devices, as discussed above. The frame period 152 may correspond to the period of time it takes the controller to transmit, or the light valve to receive, the data comprising one still image frame of many sequential image frames that, when combined, provide the illusion of motion as video. In various embodiments 30 or more frames per second are flashed.

In the embodiment of FIG. 2a, each of the light emitting devices have equal one-third duty ratios comprising one pulse $136_{(1,\ 2\ and\ 3)}$ with a duration lasting one-third of the frame period 152. A duty-ratio is intended to represent the fraction of time that a light emitting device is activated over a given time period, e.g., the frame period 152. While one constituent color is on, the others may be turned off, which may allow the light emitting device to cool prior to being activated for the next sequence. In an embodiment employing solid-state light sources, the junction diode may create heat when active, which could cause the light output to gradually decrease over the activation period. Having 'off' time in between activation periods may prevent the junction diodes from experiencing significant light output reduction due to generated heat. The pulse duration that results in an acceptable light output reduction will be application specific and may be manipulated in a variety of different ways consistent with the scope of this invention. Further embodiments, discussed below, may manifest alternative pulse sequences that may be implemented in accordance with the teachings of this invention.

In an embodiment where a quantization level of 8 is desired for each of the constituent colors, each pulse $136_{(1,\ 2\ and\ 3)}$ may be divided into 7 elemental periods. Therefore, pixel control data from the controller 112 may activate the light valve pixel for 0–7 of those elemental periods, resulting in a total of 8 different intensity levels for each of the constituent colors. In a multimedia projection system embodiment that uses a 60 fps frame rate, the frame period 152 might be ($1\ ^{sec}/_{60\ frames}$=) 16.7 milliseconds (ms), and the elemental periods might be ($16.7\ ^{ms}/_{3\ color\ periods}\ *1\ ^{color\ period}/_{7\ elemental\ periods}$=) 0.8 ms.

In this embodiment, assuming a nominal amplitude of 1, a light valve pixel that is activated for one elemental period may allow 1 light unit to pass as image bearing light, which may correspond to 1 intensity level for the constituent color. The amplitude, as used in this context, may be thought of as a multiplier of a current applied to the colored light emitting devices. So while each of the colored light emitting devices may have the same amplitude, it does not necessarily mean that they have the same applied current, it only means that the applied currents are proportional to one another. The number of light units that are available during one pulse may also be referred to as the pulse value. For example, each pulse $136_{(1,\ 2\ and\ 3)}$ in this embodiment has a pulse value of (7 elemental periods*1 amplitude=) 7 light units.

It may be noted that light units do not necessarily correspond to either lumens or photons emitted, they are used simply to facilitate the discussion of the light emitting device timing sequences and quantization of the different colors. In order to achieve a proper color balance, it may be necessary that each frame contain a different amount of lumens of each constituent color. For example, in order to achieve white light in one embodiment, it may be desirable to have approximately 60% of the lumens be green, 30% of the lumens be red, and 10% of the lumens be blue. Therefore, depending on the efficiencies of each of the light emitting devices, the driving power of each light emitting device may be adjusted to achieve this scaling. The particular operating parameters including light emitting device's efficiencies, desired color scaling, rated currents, etc., may be considered for an implementation of a specific embodiment.

FIG. 2b shows pixel control data 132 representing an object color for the image pixel for the frame period 152. The image pixel for the frame period 152 is an object color defined by, e.g., a red intensity of 5, a green intensity of 4, and a blue intensity of 7. Based on this information the pixel control data 132 will allow 5 light units of red light to pass as image bearing light by activating the light valve pixel for five elemental periods 133 during the red pulse $136_1$. Similarly, the light valve pixel will be activated for four elemental periods 134 during the green pulse $136_2$; and all seven elemental periods 135 during the blue pulse $136_3$.

While the above embodiment illustrates red, green and blue as the constituent colors, other embodiments may additionally or alternatively employ other colors, such as, but not limited to, cyan, yellow, and magenta. Additionally, an embodiment may include white light emitting devices supplementing other colored light sources to increase the effective brightness. This may be done by activating a white light emitting device for the entire frame period 152, or, alternatively, it may be pulsed along with inefficient devices or devices for which a higher lumen production is desired.

FIG. 3a depicts waveform graphs representing light emitting device pulse sequences generated in accordance with an embodiment of this invention. Specifically, waveform graphs 140, 144, and 148 represent constituent color light emitting devices, e.g., red, green and blue, that are pulsed a plurality of times during one frame period 152. Similar to the above embodiment, each of the constituent colors may have a ⅓ duty ratio, such that each is 'on' for one-third of the frame period 152. The frame period 152 may be further divided into two subframe periods 156 and 164, each containing one pulse from each of the constituent colors. Also, similar to the above embodiment, the total activation time for each constituent color may be divided up into, e.g., 7 elemental periods in order to accommodate 8 quantization levels for each of the constituent colors. In this embodiment, the first subframe 156 has pulse sequences $160_{(1,\ 2\ and\ 3)}$ of 4 elemental periods for each of the constituent colors. Therefore, the second subframe 164 has pulse sequences $162_{(1,\ 2\ and\ 3)}$ comprising the remaining 3 elemental periods.

It is not essential to pulse each constituent color one third of the frame period 152 as depicted by the above embodiments, however, it may be possible to get all of the lumen production for the frame period 152 from a particular light emitting device within this time. Pulsing a light emitting device with a current well beyond the rated current parameters may be done without substantially impacting the life of the light emitting device, relative to the product, so long as the average applied current for a given frame is no higher than the rated current for the light emitting device (determined by the manufacturer). The total light output (which could be thought of as the number of photons emitted by the light emitting device) is generally linearly proportional to the current applied. Therefore, the number of photons that may/can be emitted per frame per light emitting device is constrained by the average current for that frame. So, given n sequentially pulsed constituent colors, it may be possible to increase the current applied to the constituent colored light emitting devices to n times their rated current for a 1/n duty ratio. For example, in the context of the present embodiment with three constituent colors, pulsing the light emitting devices with three times their rated current for a ⅓ duty ratio will produce the same number of photons per frame period 152 as leaving each of the light emitting devices on at the rated current for the entire frame period 152. Therefore, because light emitting devices of each constituent color may be activated at separate times, they may timeshare the same light valve 118 without a significant reduction of light output.

Figure 3B:
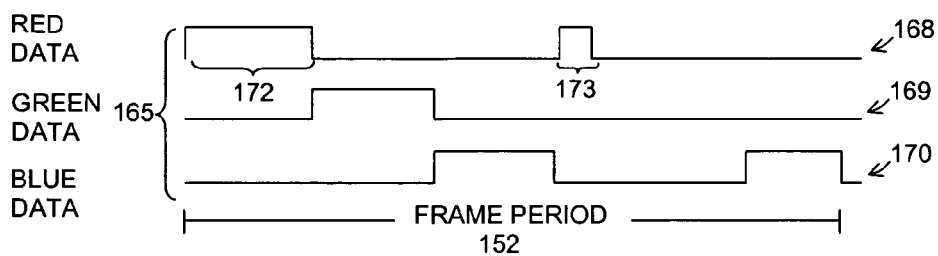

FIG. 3b shows pixel control data 165 representing an object color for the image pixel for the frame period 152. The image pixel for the frame period 152 may be an object color similar to the above embodiment, defined by, e.g., a red intensity of 5, a green intensity of 4, and a blue intensity of 7.

In accordance with the illustrated embodiment, the pixel control data 165 may synchronize the operation of the light valve pixel with the constituent color pulses of the first and second subframes 156 and 164. The data for the first constituent color, e.g., red, 168, which has an intensity level of 5, may be partitioned into a first signal 172 to activate the light valve pixel for no longer than the red pulse $160_1$ of the first subframe 156. In this example, the light valve pixel is activated for four elemental periods. The remaining red data, comprising 1 remaining light unit, may be applied as a signal 173, to activate the light valve pixel for the remaining one elemental period during the red pulse $162_1$ of the second subframe 164. The shortened pulses of this embodiment may result in the light emitting devices generating less heat than a single long activation period, thereby potentially reducing light output degradation. The green and blue data 169 and 170 may be synchronized with the corresponding pulses ($106_2$ and $160_3$; $162_2$ and $162_3$) of the first and second subframes 156 and 164 in a similar fashion.

Figure 4A:
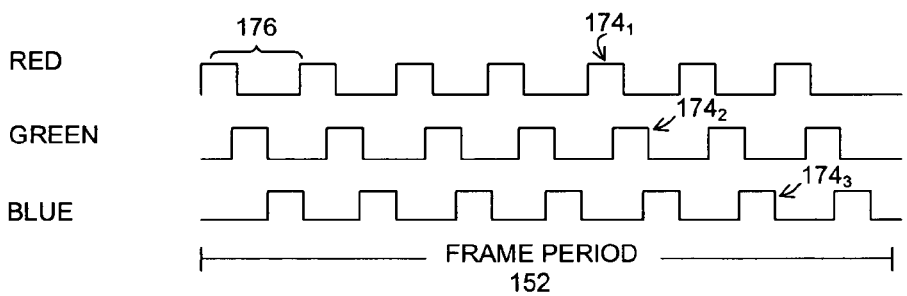
FIGS. 4a–4b depict waveform graphs representing elemental period light emitting device pulse sequences with a corresponding pixel control data, in accordance with another embodiment of this invention.

FIG. 4a represents a light emitting device pulsing sequence generated in accordance with another embodiment of the present invention. This embodiment is similar to the above embodiments with respect to color depth, frame period, and object color, however, in this embodiment, the pulse 174 has a pulse value decreased to a degree corresponding with a least significant bit (LSB) of the color depth discussed above. In this embodiment, all of the pulses 174 of the different constituent colors and of different subframes have equivalent pulse values. In many cases, and as shown in this embodiment, the LSB will be a pulse lasting for a single elemental period, but this may not always be the case. Producing a pulse of this duration is well within the capabilities of modern solid state light sources, some of which are capable of producing pulses in the nanosecond range. In the illustrated embodiment, the subframe 176 lasts for three elemental periods, with a total of seven subframes 176 for the frame period 152.

Figure 4B:
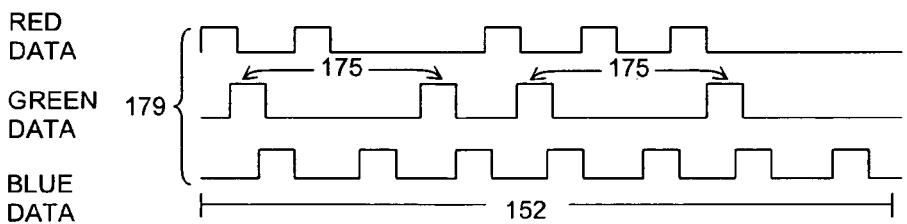

Referring to FIG. 4b, the controller may generate pixel control data 179 that may facilitate the synchronization of the light valve pixel with the pulse sequencing described in FIG. 4a. As illustrated in FIG. 4b, it is not necessary that the light valve pixel be activated as early in the frame period 152 as possible. For example, the four light units of green data 175 do not have to be transferred to the light valve pixel in the first four subframes 176. Instead they may be spread out over the entire frame period 152 as shown. However, in an alternative embodiment, the constituent color data may be presented to the light valve pixel as early (or late) in the frame period 152 as possible.

Figure 5A:
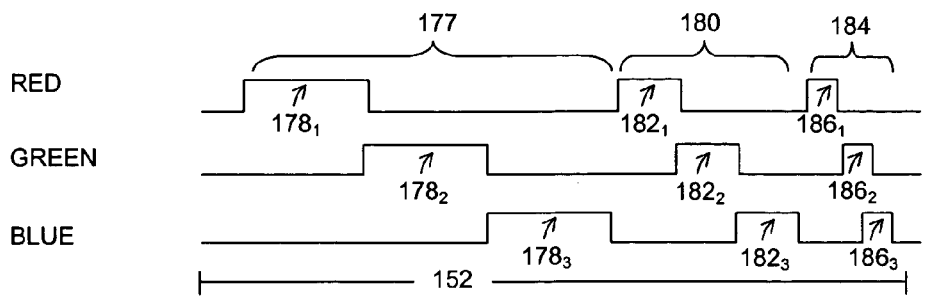
FIGS. 5a–5b depict waveform graphs representing light emitting device pulse sequences with varying pulse durations in subsequent subframes along with a corresponding pixel control data, in accordance with another embodiment of this invention.

The embodiment depicted by FIG. 4a illustrates the pulses of subsequent subframes 176 having equivalent duration and amplitude. However, this may not always be the case. For example, an embodiment could be designed such that either, or both, of the amplitude and duration of pulses of subsequent subframes could change. FIG. 5a depicts one example of such an embodiment.

In FIG. 5a there is presented three subframes 177, 180, and 184 comprising pulses of differing pulse durations, in accordance with an embodiment of the present invention. Each of the subframes 177, 180, and 184 includes pulses of a certain pulse value, that may reflect the bit-values representing each of the constituent colors of the object color.

Figure 6:
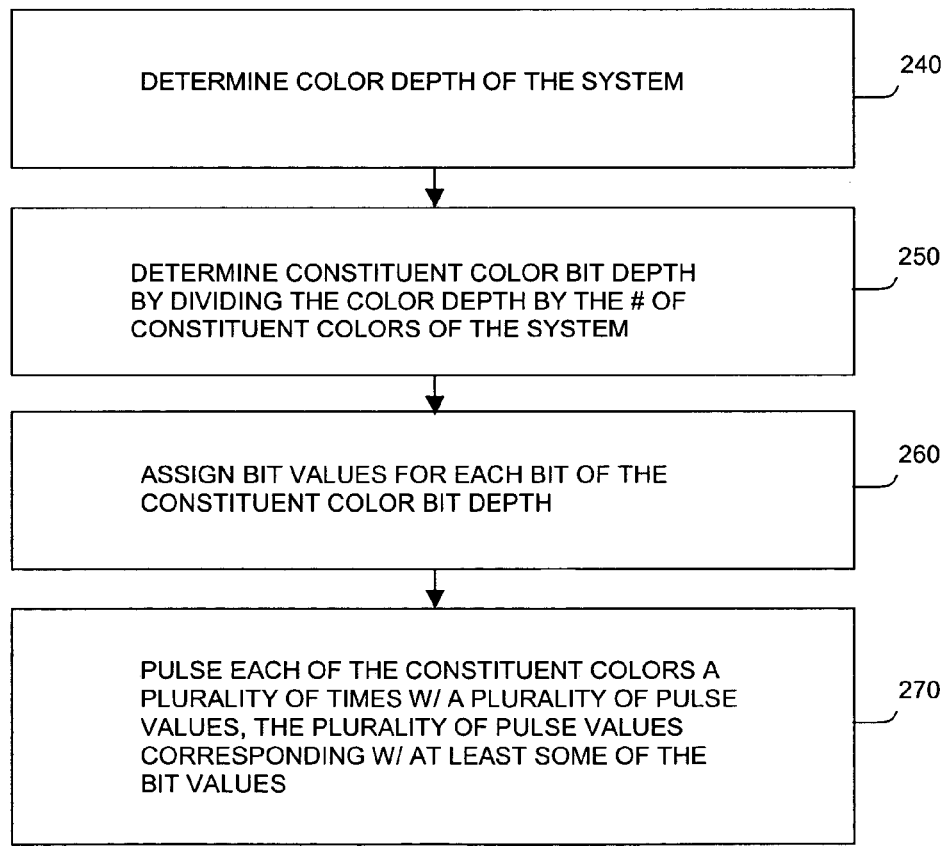
FIG. 6 depicts a methodology for designing light emitting device pulse values to reflect bit values of the constituent color bit depth, in accordance with an embodiment of this invention.

FIG. 6 depicts a methodology of one embodiment for pulsing constituent colors with pulse values corresponding to bit values. First, the color depth of the system may be determined, e.g. 9-bits 240. This color depth may then be divided by the number of constituent colors used in the system, e.g., 3 (red, green and blue) 250. This results in the constituent color bit depth, e.g., 3-bits/constituent color, or the quantization level. Therefore, each constituent color may be represented by three bits in the frame buffer memory. Each bit of the constituent color bit depth may be assigned a bit value 260. For example, the three bits of a 3-bit constituent color bit depth could have bit-values of 4 (MSB), 2, and 1 (LSB). Lastly, each of the constituent colors could be pulsed a plurality of times with a plurality of pulse values corresponding with at least one of the bit values 270. For example, referring to FIG. 5a, pulses $178_{(1, 2 \ and \ 3)}$ of the first subframe 177 could have a pulse value of four (duration of four elemental periods and an amplitude of 1) to correspond with the MSB, pulses $182_{(1, 2 \ and \ 3)}$ of the second subframe 180—two, and pulses $186_{(1, 2 \ and \ 3)}$ of the third subframe 184—one.

It is not essential that the pulses be in order from the most significant pulse (MSP) $178_{(1, 2 \ and \ 3)}$ to the least significant pulse (LSP) $186_{(1, 2 \ and \ 3)}$, and may not be so in other embodiments. Additionally, it is not essential that one pulse accommodate each bit value. For example, in one embodiment, the MSB could be applied over pulses of several subframes spread throughout the frame.

It may be noted that the above embodiment assumes that the system's color depth will be equally divided between the constituent colors. Alternative embodiments may employ different allocation schemes. In one embodiment, a constituent color's pulse values may correspond specifically to that constituent color's bit values.

Figure 5B:
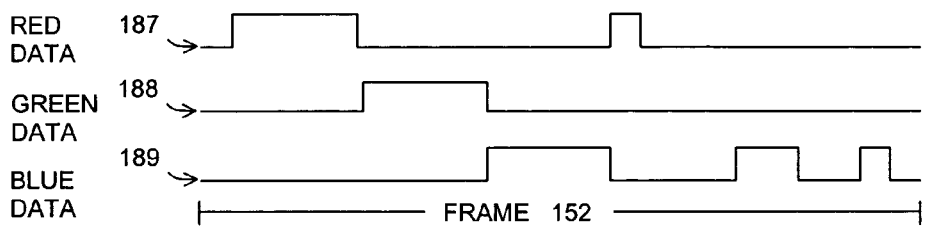

The red data 187, depicted in FIG. 5b, may be divided so that 4 light units pass during the MSP $178_1$ in the first subframe 177 with the remaining 1 light unit to pass during the pulse $182_1$ of the next subframe 180. However, the 1 remaining light unit does not have to be applied in the next consecutive pulse period. For example, an alternative embodiment could associate the 1 remaining light unit with the pulse having the most closely related pulse value, which in this embodiment would be the LSP 186 of the third subframe 184. The remaining constituent color data 188 and 189 may be presented to the light valve pixel in a similar process.

Figure 7A:
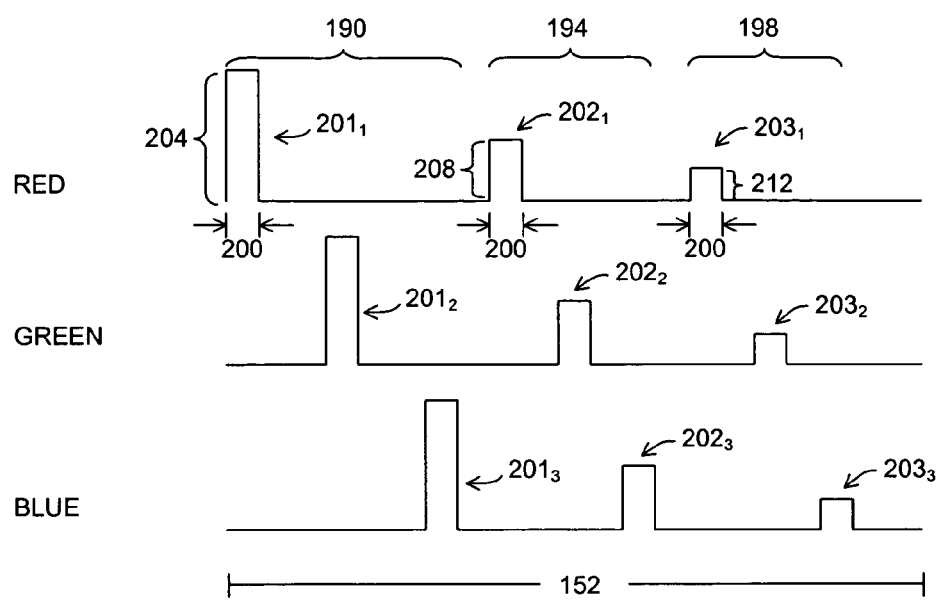
FIGS. 7a–7b depict waveform graphs representing light emitting device pulse sequences with varying pulse amplitudes in subsequent subframes along with a corresponding pixel control data, in accordance with another embodiment of this invention.

FIG. 7a depicts a light emitting device pulse sequence comprising pulses of varying amplitudes in accordance with an embodiment of this invention. Similar to the above embodiment, there are three subframes 190, 194, and 198 including pulses $201_{(1, 2 \ and \ 3)}$, $202_{(1, 2 \ and \ 3)}$, and $203_{(1, 2 \ and \ 3)}$ of different pulse values. However, the pulses of this embodiment $201_{(1, 2 \ and \ 3)}$, $202_{(1, 2 \ and \ 3)}$, and $203_{(1, 2 \ and \ 3)}$ have equivalent durations 200 with differing amplitudes 204, 208, and 212. Also similar to the above embodiment, the first subframe 190 corresponds to the MSB of the constituent color bit depth, the second subframe 194 corresponds with an intermediate bit-value, and the third subframe 198 corresponds to the LSB.

Figure 7B:
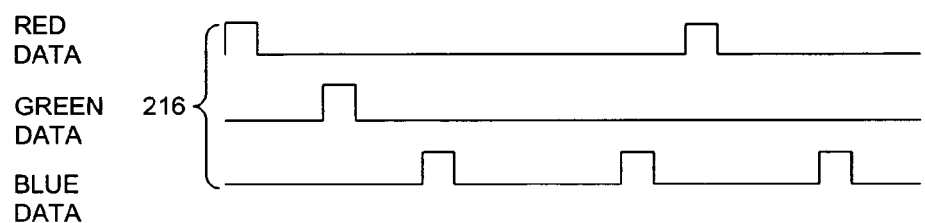

Corresponding pixel control data 216 for the present embodiment is represented in FIG. 7b. When the 'on' signal is sent to the light valve pixel during, e.g., the red pulse $201_1$ of the first subframe 190, the pixel transmits four light units of red data, due to the corresponding pulse value of the red pulse $201_1$. With only one light unit of red data remaining, the light valve pixel may be activated during the third subframe 198, which has a pulse $203_1$ having a pulse value of 1(duration of 1 elemental period and an amplitude of 1). In this embodiment, due to the on/off state of the light valve pixel, the light valve pixel may be activated when the remaining light units of data is greater than, or equal to the amplitude of the pulse.

It may be noted that in accordance with this embodiment illumination source 104 may produce the same amount of light in less time, however, as discussed above, the average amount of current applied to the light emitting devices may limit the total amount of light output per frame. So, in this embodiment, the pulses may be spaced such that there is a buffer between each activation period where no light emitting devices will be active. This buffering may compensate for slight timing misalignments between the light valve pixels and the light emitting devices.

Embodiments with larger color depths may require specific amplitude and/or duration modulations in order to accommodate the particular system within the imposed constraints. These modifications may result in non-uniform pulses for different colors, subframes, etc. For example, one embodiment may include subframes having a green pulse value of 6, a red pulse value of 3, and blue pulse value of 1.

Although specific embodiments have been illustrated and described herein for purposes of the description, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
an illumination source including a number of light emitting devices each emitting incident light of a different constituent color, and having a duty ratio for a frame period approximately inversely proportional to the number of light emitting devices; and
a light valve, optically coupled to the illumination source, to modulate the incident light into image bearing light for the frame period.

2. The apparatus of claim 1, wherein the number of light emitting devices comprise one or more light emitting diodes.

3. The apparatus of claim 1, wherein the number of light emitting devices comprise
a first light emitting device to emit light of a first color;
a second light emitting device to emit light of a second color;
a third light emitting device to emit light of a third color; and
each of the first, second, and third light emitting devices to emit light as a plurality of pulses for the frame period.

4. The apparatus of claim 3, wherein each of the first, second and third light emitting devices emit light of a selected one of a group consisting of red color, a blue color, and a green color.

5. The apparatus of claim 3, wherein the frame period comprises at least two subframe periods, each of the at least two subframe periods to include at least one pulse from each of the first, second and third light emitting devices.

6. The apparatus of claim 5, wherein only one of the first, second, and third light emitting devices emit light at one time.

7. The apparatus of claim 1, wherein at least one of the number of light emitting devices, having a rated current, is pulsed at a current approximately proportional to the number of light emitting devices times the rated current.

8. The apparatus of claim 1, further comprising
a controller, coupled to the light valve, adapted to receive data representing an image frame and to synchronize operation of the light valve with the incident light according to the data for the frame period.

9. An apparatus comprising:
a light valve to modulate light over a frame period; and
an illumination source including a light emitting device to provide light to the light valve as a plurality of pulses over the frame period, a first pulse of the plurality of pulses configured to have a pulse duration based at least in part on a reduction in light output over a course of the pulse duration.

10. The apparatus of claim 9, wherein the light emitting device is a first light emitting device to emit light of a first color and the illumination source further comprises:
a second light emitting device to emit light of a second color;
a third light emitting device to emit light of a third color; and
each of the first, second, and third light emitting devices to emit light as a plurality of pulses for the frame period.

11. The apparatus of claim 9, wherein the light emitting device has a duty ratio for the frame period and a rated current, and the first pulse of the plurality of pulses has a pulse amplitude based at least in part on the duty ratio and the rated current.

12. The apparatus of claim 11, wherein at least the first pulse of the plurality of pulses is pulsed with a current over the rated current, and the average current applied to the light emitting device over the frame period is approximately equal to or less than the rated current.

13. A method comprising:
presenting data representing an image frame to a light valve to facilitate the modulation of light over a frame period; and
illuminating the light valve with a plurality of pulses from a light emitting device over the frame period, a first pulse of the plurality of pulses configured to have a pulse duration based at least in part on a reduction in light output over a course of the pulse duration.

14. The method of claim 13, wherein the light emitting device is a first light emitting device providing a first plurality of pulses and said illuminating of the light valve further comprises:
providing a second plurality of pulses with a second light emitting device; and
providing a third plurality of pulses with a third light emitting device.

15. The method of claim 14, wherein at least one pulse from each of the first, second, and third plurality of pulses have similar durations and/or amplitudes.

16. The method of claim 15, wherein said illuminating the light valve with a plurality of pulses further comprises illuminating the light valve with a plurality of pulses having pulse values corresponding to a least significant bit of the data representing the image frame.

17. An apparatus comprising:
an illumination source including a plurality of light emitting devices to emit incident light as a plurality of pulses of a number of colors, at least one of the plurality of light emitting devices having a duty ratio for a frame period approximately inversely proportional to the number of colors; and
a light valve, optically coupled to the illumination source, to modulate the incident light over the frame period.

18. An apparatus of claim 17, wherein the at least one of the plurality of light emitting devices, having a rated current, is pulsed at a current approximately proportional to the number of colors times the rated current.

* * * * *